United States Patent [19]
Longacre, Jr. et al.

[11] Patent Number: 5,286,960

[45] Date of Patent: Feb. 15, 1994

[54] METHOD OF PROGRAMMABLE DIGITIZATION AND BAR CODE SCANNING APPARATUS EMPLOYING SAME

[75] Inventors: Andrew Longacre, Jr.; Charles M. Hammond, Jr.; William H. Havens; John M. Pidhirny, all of Skaneateles, N.Y.

[73] Assignee: Welch Allyn, Inc., Skaneateles Falls, N.Y.

[21] Appl. No.: 787,534

[22] Filed: Nov. 4, 1991

[51] Int. Cl.$^5$ .............................................. G06K 7/10
[52] U.S. Cl. ..................................... 235/463; 235/472
[58] Field of Search ................ 235/463, 462, 472, 454

[56] References Cited

U.S. PATENT DOCUMENTS

| | | | |
|---|---|---|---|
| 3,887,792 | 6/1975 | Williams | 235/463 |
| 3,890,597 | 6/1975 | Hanchett | 235/463 |
| 3,909,594 | 9/1975 | Allais et al. | |
| 4,335,301 | 6/1982 | Palmer et al. | |
| 4,356,389 | 10/1982 | Quirey et al. | |
| 4,724,322 | 2/1988 | Knowles et al. | 235/454 |
| 4,833,309 | 5/1989 | Yomogida | |
| 5,134,272 | 7/1992 | Tsuchiya et al. | 235/462 |
| 5,155,343 | 10/1992 | Chandler et al. | 235/463 |

FOREIGN PATENT DOCUMENTS

2635207 6/1990 France .

*Primary Examiner*—David C. Nelms
*Assistant Examiner*—K. Shami
*Attorney, Agent, or Firm*—Harris Beach & Wilcox

[57] ABSTRACT

A method and apparatus are provided for detecting bar-space and space-bar transitions in a bar code symbol. A sequence of sparsely sampled analog signals from a photodetector in a bar code scanner is representative of the reflectance pattern of a symbol.

Following initialization, a threshold, representing the value of the analog signal at a transition point, is derived from observed samples of the bars and spaces in the bar code symbol. Sampled reflectance information is accumulated as the symbol is scanned, and a program driven microprocessor calculates and repeatedly updates this threshold, using observed maxima and minima in the analog samples, and also referencing a binary output to determine whether a bar or space is currently being viewed.

When the values of two successive analog samples bracket this threshold, then a bar-space or space-bar transition has occurred. Linear interpolation is performed on the two samples to determine the transition point and an offset from the first of the two samples. After a delay corresponding to this offset, the level of a binary output is changed. A bit serial binary output is thus produced, representative of the relative widths of bars and spaces.

29 Claims, 4 Drawing Sheets

METHOD OF PROGRAMMABLE DIGITIZATION AND BAR CODE SCANNING APPARATUS EMPLOYING SAME

BACKGROUND OF THE INVENTION

This invention relates generally to optical code reading devices and more specifically to a programmable recognition device employed in conjunction with bar code scanning circuits that allow the transition points between bars and spaces to be identified.

In bar code reading equipment it is essential to accurately identify those areas that are presented as optical elements (bars and spaces) as the bar code symbol is scanned or read. This is particularly true in the case of commonly used codes, both linear and stacked linear, where information is not only found in the presence of bars and spaces, but also in their relative width dimension. Bar code recognition circuitry conventionally converts an analog signal that is generated by a photodetector to a bit serial binary representation of the bar-space pattern. Conventionally this process of determining the transition points is performed by the digitizer.

In practice, detecting the location of a transition point is often complicated by noise. Such noise can arise from diverse sources such as varying ambient light, physical impediments to the path of light to and from the bar code symbol such as dirt, defocusing, fading or irregularities in the print, microphonics within the scanner, and optical scattering caused by the well known diffusion and laminate effects. Other sources of noise and error are known in the bar code reading art.

Conventionally a time sampled scanning bar code scanner (reader) performs a relatively sparse temporal sampling of a bar code symbol being scanned, while a CCD bar code scanner performs, analogously, a relatively sparse spatial sampling of a bar code symbol being scanned. The information density realized by a scan is a function of the modulation transfer function of the optical system, the physical size of the symbol and, depending upon the type of device, the scanning rate or the granularity of the photodetectors. The temporal or spatial samples are presented to signal processing circuitry as a sequence of amplitude levels having maxima and minima. Bar-space and space-bar transitions are represented by relatively fast amplitude transitions. Typically the transition point is defined as being intermediate the maxima and minima which are indicative of light and dark areas on the bar code symbol. It will be evident that a transition point generally will not occur precisely at a sampled point, but will lie between samples. Failure to take this fact into account can result in significant inaccuracy in determining the transition point, in determining the relative width of the space or bar, and in the interpretation of the bar code symbol. These problems, are further exacerbated by the aforementioned noise factors.

In practical microprocessor based bar code equipment, memory, specifically random access memory, RAM, is at a premium. Although it is in principle possible to store the entire series of digital words representing the sampled analog signal levels, this would require unnecessarily large amounts of costly RAM. For this reason it is highly desirable to have implementations which require the smallest possible amount of RAM.

In U.S. Pat. No. 3,909,594 to Allais et al., there is shown a circuit that establishes a variable reference voltage, allowing the reader to compensate for variations in the amplitude of the photodetector signal caused by noise. The reference voltage is utilized by a comparator to identify the presence of a bar or a space.

In the disclosure of U.S. Pat. No. 4,335,301, to Palmer et al, two positive and negative peak detecting circuits define a varying reference voltage having a value that is intermediate to positive and negative peak voltages and can be used to identify a transition between bars and spaces. This circuit is able to compensate for reflectance variations among successive bars or spaces.

U.S. Pat. No. 4,833,309 to Yomogida discloses a peak hold circuit for converting an analog signal from a bar code detector into a digital signal. Reference signals corresponding to peaks are compared with an incoming signal in order to determine a transition. Compensating adjustments in the levels of the reference signals can be effected, tending to reduce the influence of noise on detection of transitions between bars and spaces.

While the above circuits are useful in defining the signal level that indicates a space-bar or bar-space transition, they do not address the problem of accurately locating the point in time or position at which a sparsely sampled analog signal crosses the defined level. It is not only possible to correct this deficiency in hardware, but it is also possible to implement this correction in a programmable, microprocessor based signal digitizer.

SUMMARY OF THE INVENTION

It is therefore a primary object of the present invention to determine the transition points of a temporally sparsely sampled analog signal representation of a bar code symbol.

It is another object of the present invention to determine the transition points of a spatially sparsely sampled analog signal representation of a bar code symbol.

It is still another object of the present invention to provide an improved program driven implementation for a bar code digitizer.

It is another object of the present invention to accurately identify the transition points between bars and spaces in a bar code symbol.

Yet another object of this invention is to accurately reconstruct the transition points between bars and spaces, using a minimal amount of random access microprocessor memory.

It is a further object of the present invention to provide an improved program driven implementation for a bar code digitizer that can process a bar code symbol substantially in real time.

These and other objects of the present invention are attained by accepting as input the analog signals from a bar code scanner, and producing a digitizer output in which a bar code symbol is represented as a bit serial binary signal.

The analog output signal of a sampled bar code scanner is a discretized signal that corresponds to the temporally or spatially sampled bar code symbol. The amplitude of a particular quantum of the analog signal corresponds to the amount of light reflected from a relatively small region on the symbol that is viewed by a bar code scanner. It is helpful in understanding the invention to refer to FIG. 3, wherein there is shown diagrammatically a bar code symbol 30 comprising dark bars 32a, 32b, separated by white spaces 31a, 31b. Signal 34 (shown as segments 34a–34f and continuing) is a step function representation of the analog signal 33, which is a convolution of target reflectivity and a generalized machine transfer function. Step function 34 is broken down into the individual steps 34a–34f, and represents a fragment of the analog signal produced during the scanning of a bar code symbol and then being sparsely temporally sampled by an analog-to-digital converter or being sparsely spatially sampled by a CCD array. Line 39 corresponds to the value of the convolved reflectance function at a particular space-bar transition 37. In the preferred embodiment an estimator of the value of the analog signal at a transition point is derived from observed reflectance characteristics of bars and spaces in the bar code symbol. Reflectance information is accumulated as the symbol is scanned, and a program driven microprocessor calculates and repeatedly updates the estimator. Local maxima and minima in the analog samples, representing reflectances of spaces and bars, are used in the preferred embodiment to determine this estimator; however it could be determined using other values that can be derived from the sampled analog data, such as average reflectance values associated with spaces and bars.

Samples of the analog signal, taken at times or positions corresponding to points 35a and 35b, would indicate the existence of the edges of signal 34c. The error in assigning the edge 37 of bar 32a would be the widths 39a or 39b respectively, and a transition in the worst case could have an error approaching the width of signal 34c. Since each bar or space has two edges, the cumulative error in determining the width could be even greater.

Study of convolved reflectance functions in bar code scanners, exemplified by analog signal 33, has revealed that the second derivative is small or zero in the region corresponding to transitions such as transition 37. As function 33 is nearly linear in the region of the transition (shown as region 41), it can be closely approximated by linear reconstruction using sampled outputs 34c and 34d, shown as line 38. Offset 39a can then be readily determined by linear interpolation. While linear interpolation is utilized in the preferred embodiment, it will be appreciated by those skilled in the art that nonlinear interpolation, or even a form of extrapolation, could be employed without departing from the spirit of the invention.

The microprocessor directing algorithm for accurate reconstruction of the transition points between bars and spaces when a bar code symbol is temporally or spatially sampled comprises repeatedly, accepting as input the amplitudes of successive samples representing a sampled analog signal, processing this input in order to determine accurately the time of transition from bar to space and vice versa, and sending as an output a digitized signal whose transitions from low to high and vice versa reflect the actual transition points in the original bar code symbol being scanned. This may be accomplished, starting with a region of high reflectance, by determining the amplitude of a high reflectance portion of such input signal, determining from successive samples a first threshold intermediate such high signal to a low signal, performing a linear interpolation on the two successive samples bracketing the first threshold in order to determine at which point in time said transition from a high to low reflectance occurred, sending as output a signal having a first logical state, whose time of transition from high to low correlates with the actual transition point of the analog signal. The next transition, which is from low reflectance to high reflectance, is established by determining the amplitude of this low reflectance portion of such input signal, determining from successive samples a second threshold intermediate this low signal and high signal, performing a linear interpolation on the two successive samples bracketing the second threshold in order to determine at which point in time said transition from a low reflectance to a high reflectance occurred, and sending as output a signal having a second logical state, whose time of transition from low to high correlates with the actual transition point of the analog signal. Thus, the intervals between successive first and second logical signal outputs accurately reflect the relative width of spaces and bars in the bar code symbol that is being scanned.

While the preferred embodiment transforms the original barspace width representation in the bar code symbol to a bit serial binary representation, it is possible to produce other forms of output, such a digital word, representing the elapsed system time when the output is asserted. Another output would be the value of a counter that measures the elapsed time since a previous output transition was asserted. Such output forms may be advantageous when the digitizer is integrated with further decoding means.

In the preferred embodiment, this algorithm is implemented in a program in conjunction with a microprocessor in a bar code scanner. The program can be stored in a random access memory, a read only memory, any of the PROMs that are well known to the art, or in secondary storage. The program may also be implemented in hardware equivalents, such as a logical gate array.

BRIEF DESCRIPTION OF THE DRAWINGS

For a better understanding of these and other objects of the present invention, reference is made to the detailed description of the invention which is to be read in conjunction with the following drawings, wherein:

FIG. 2 represents a more detailed flow chart of the initialization shown in FIG. 1a.

DETAILED DESCRIPTION OF THE INVENTION

Figure 1A:
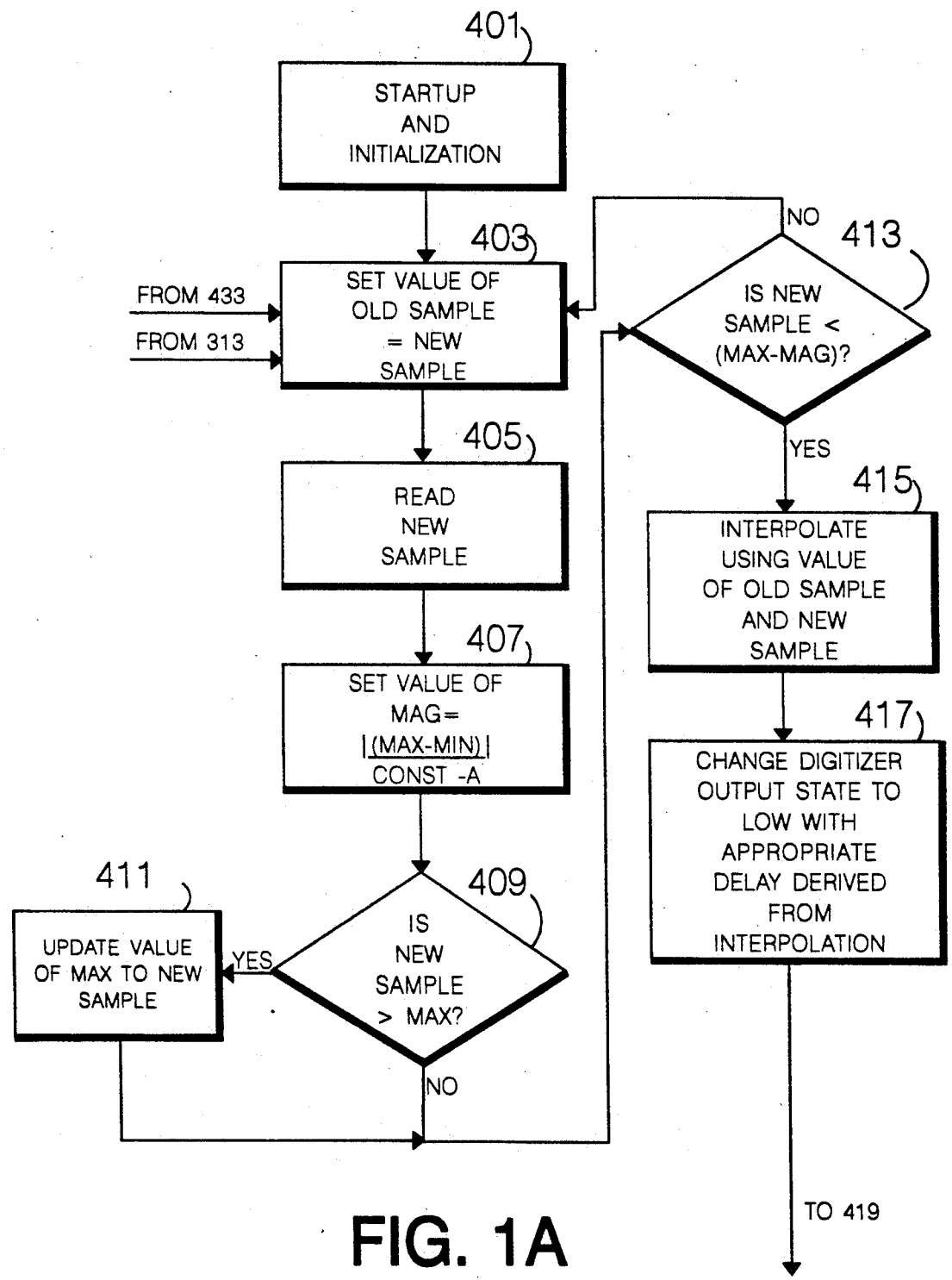
FIGS. 1a and 1b represent a flow chart of one embodiment of a microprocessor based algorithm to accurately reconstruct the transition points between bars and spaces when a bar code symbol is sparsely sampled.
Figure 1B:
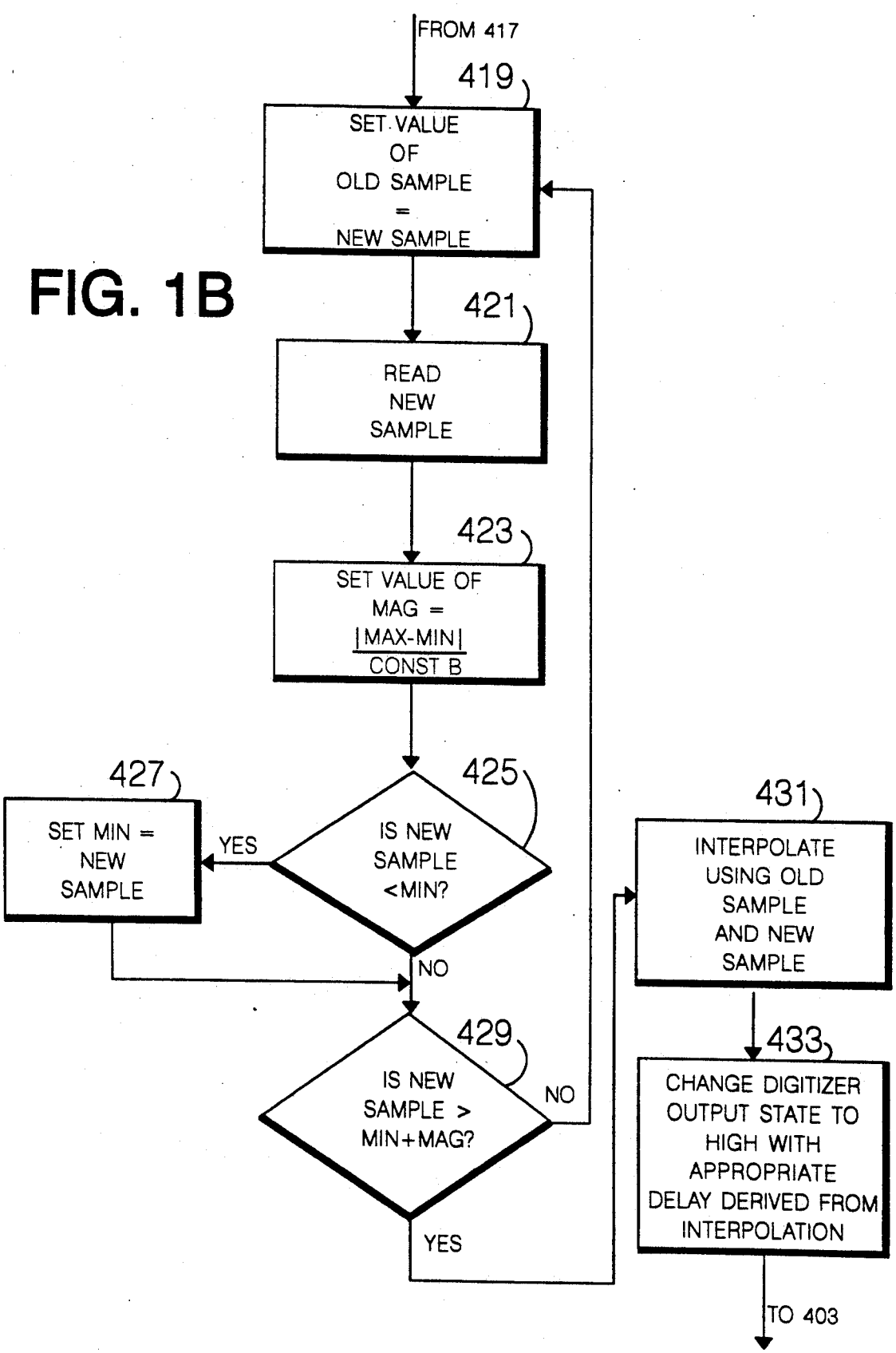
Figure 2:
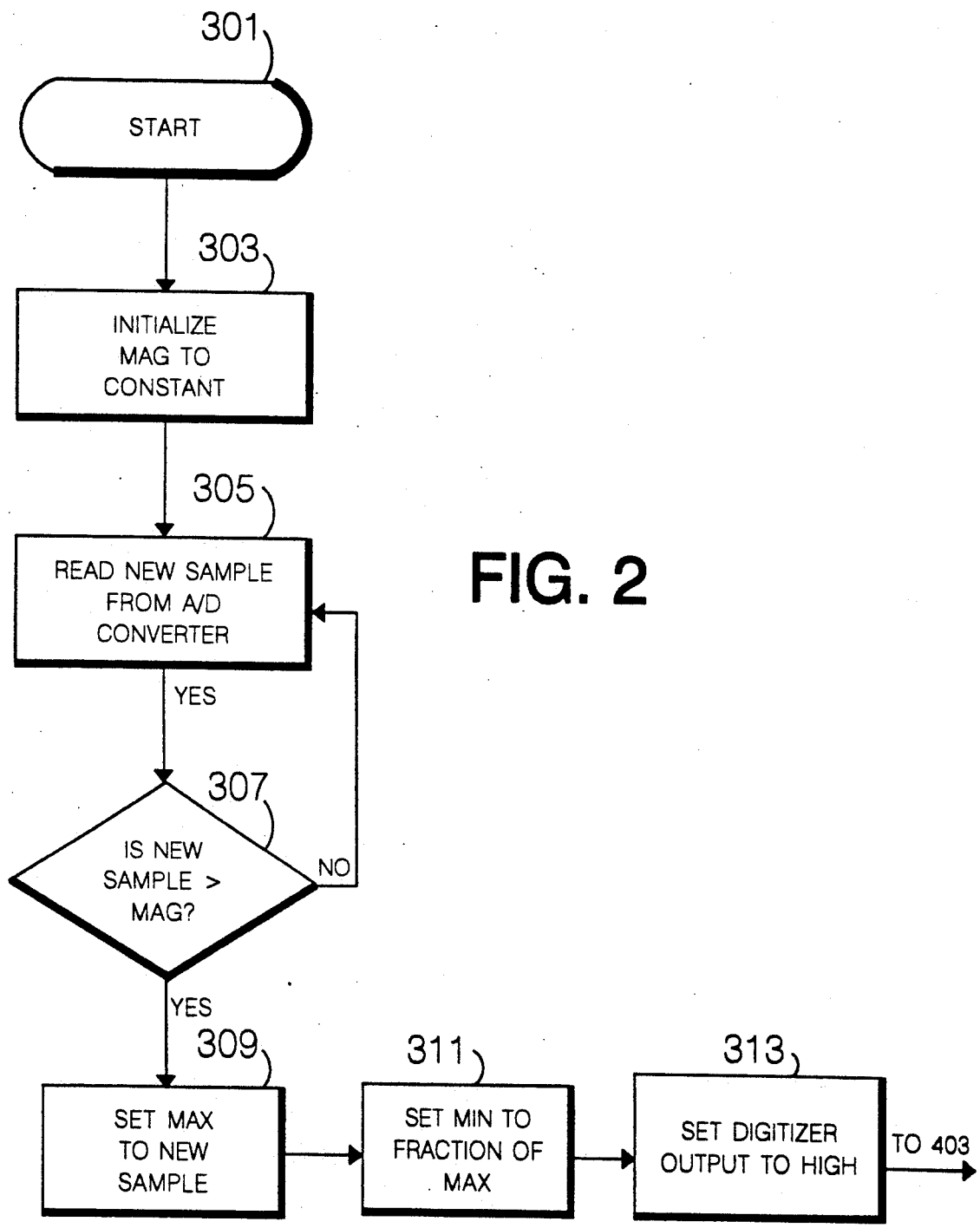

Referring now to FIGS. 1a and 1b there is shown a flow chart representing one embodiment of the instant invention. A conventional photosensor or photosensor and light source combination (not shown) in a bar code scanner produces analog signals in response to light reflected from a bar code symbol, which, when sampled, represent the optical reflectance pattern of the bar code symbol being scanned. This embodiment may be contained in a single housing. The signals are coupled to analog-to-digital converter 305. The process begins with a startup and initialization process, 401, which is shown in further detail in FIG. 2. By convention, in these flow charts white (high reflectivity) is represented by a high signal and black (low reflectivity) by a low signal. Also, by convention, all numeric values given are in terms of reflectance values. The state of the initial digitizer output reflects a signal appropriate to a white field—that is a high signal.

As part of the initialization 401, the machine is turned on 301. The value of MAG, stored in a register, is initialized 303 to some constant. In the preferred embodiment, this constant is 40. Next, a NEW SAMPLE is obtained from the analog to digital converter 305 and evaluated 307 to determine whether the signal value of NEW SAMPLE is greater than MAG. If it is not greater than MAG then another NEW SAMPLE is obtained 305 and evaluated 307.

If, on the other hand, the NEW SAMPLE value is greater than MAG, then MAX, also stored in a register and representing a white value, is set to the value of the NEW SAMPLE 309 and MIN, stored in another register and representing a black value, is set to some fraction of MAX 311. In a preferred embodiment this value for MIN is one half that of MAX. A digitizer output is now asserted 313 at a high level, indicating that a region of high reflectivity is being viewed. This step completes the initialization.

Referring, now, back to FIG. 1, following the initialization 401, the value of OLD SAMPLE is set to the value of NEW SAMPLE 403 and another NEW SAMPLE is obtained 405. MAG, a variable holding a magnitude that is used to adjust the white and black values, is then set 407 equal to the unsigned difference between MAX and MIN divided by the constant CONST-A. This unsigned difference is the largest excursion between black and white states that is presently known. In a preferred embodiment the constant CONST-A is 4.0.

NEW SAMPLE is tested 409 to determine if it is greater than MAX. If it is, then the value of MAX is set to NEW SAMPLE 411 and the value of NEW SAMPLE tested to see if it is less than the value of MAX minus MAG 413. If, however, NEW SAMPLE is less than or equal to MAX, then the value of NEW SAMPLE is tested directly to see if it is less than the value of MAX minus MAG 413.

In either case, if the value of NEW SAMPLE is greater than or equal to the value of MAX minus MAG, then, again, the value of OLD SAMPLE is set to NEW SAMPLE.

If, on the other hand, the value of NEW SAMPLE is less than the value of MAX minus MAG, then the values of OLD SAMPLE and NEW SAMPLE bracket a threshold that has been computed by adjusting the white value by MAG in a direction of decreasing reflectivity, and a transition from white to black has occurred. In that case, an interpolation is performed, using the values of the OLD SAMPLE and the NEW SAMPLE 415. Thereafter, the digitizer output state is changed to a low value, after an appropriate delay or offset 417 whose length is derived from the results of the interpolation 415.

Figure 3:
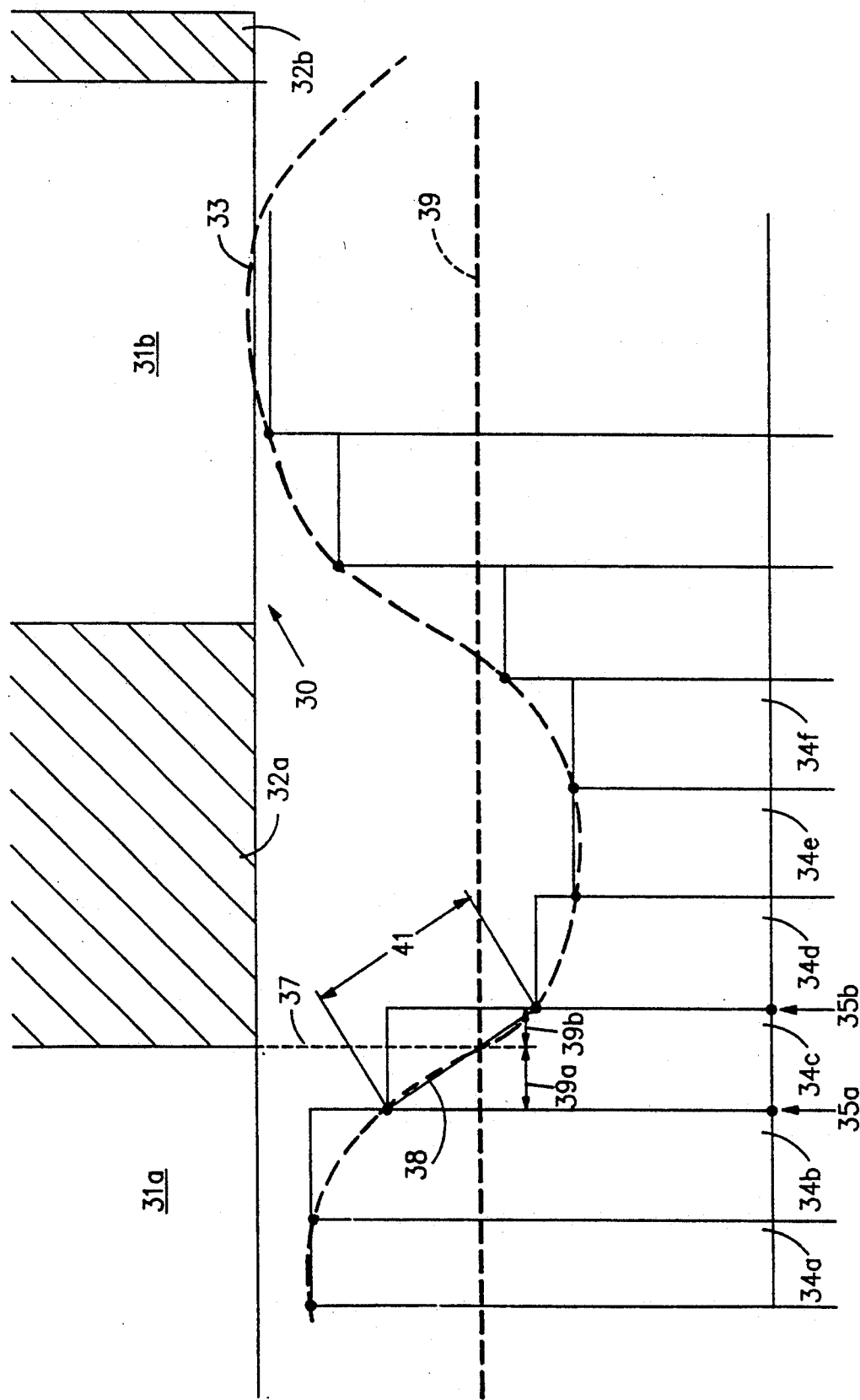
FIG. 3 represents a fragment of a bar code symbol, along with its analog representation and associated sparsely sampled analog representation thereof.

The basis for the interpolation of 415 and also 431 is demonstrated in FIG. 3 which shows an analog signal, 33 which represents the continuous spatial reflectance function of the bar code symbol 30 as convolved with a machine transfer function, comprising dark bars 32a, 32b, separated by white spaces 31a, 31b. Signal 34, comprising square wave forms 34a-34f, represents a fragment of the reflectance function that is the analog output of the electro-optic bar code detection means for scanning the symbol. The samples are taken with a given spacing (time or spatial) which is usually, but not necessarily, fixed as to period, and approximate continuous analog signal function 33. Line 39 corresponds to the value of the convolved reflectance function at a particular space-bar transition 37.

Samples of the analog output, taken at times or positions corresponding to points 35a and 35b, would indicate the existence of the edges of signal 34c. Due to the observation that the second derivative of the analog signal 33 is small or zero in the region corresponding to transitions such as transition 37 it is known that signal 33 is nearly linear in the region of the transition (shown as region 41). Thus, it can be closely approximated by linear reconstruction between outputs 34c and 34d, shown as line 38. Offset 39a can then be readily determined by linear interpolation.

Returning, then to the flow chart of FIG. 1b., after asserting the digitizer state at a low value 417, the value of OLD SAMPLE is set to that of NEW SAMPLE 419 and another NEW SAMPLE is obtained 421. The value of MAG is set 423 to the unsigned difference of MAX and MIN divided by the constant CONST-B. In the preferred embodiment CONST-B is 4. In certain applications the values of CONST-A and CONST-B may be different in order to minimize irregularities such as the diffusion effect and the laminate effect.

NEW SAMPLE is tested 425 to determine if it is less than MIN. If it is, then the value of MIN is set to NEW SAMPLE 427 and the value of NEW SAMPLE tested to see if it is greater than the value of MIN plus MAG 429. If, however, NEW SAMPLE is greater than or equal to MIN, then the value of NEW SAMPLE is tested directly to see if it is greater than the value of MIN plus MAG 429.

In either case, if the value of NEW SAMPLE is less than or equal to the value of MIN plus MAG, then, again, the value of OLD SAMPLE is set to NEW SAMPLE.

If, on the other hand, the value of NEW SAMPLE is greater than the value of MIN plus MAG, then the values of OLD SAMPLE and NEW SAMPLE again bracket the threshold, which has been computed by adjusting the black value in the direction of increasing reflectivity, and a transition from black to white has occurred. In that case, an interpolation is performed, using the values of the OLD SAMPLE and the NEW SAMPLE 431. Thereafter, the digitizer output state is asserted at a high value, after an appropriate delay 433 whose length is derived from the results of the interpolation 431.

Following this, the process repeats, whereby the value of OLD SAMPLE is again set to that of NEW SAMPLE 403 in preparation for the detection of the next white to black transition.

In some applications, the initial state of the reflectance level of the bar code symbol can be guaranteed to be high or low, in which case the digitizer output can be initially asserted accordingly, and the initialization steps 305-313 can be omitted, and other initialization processes may be appropriate.

It is sometimes advantageous to compute the values of MAX and MIN based on samples in the vicinity of a transition being considered, as opposed to the global definitions shown above. This is true, for example, when the reflectance levels in a bar code symbol are subject to relatively fast variations in regions that span one or more bars and spaces and are independent of the pattern of the symbol itself.

It is important to note that the digitizing process described above can be performed substantially in real time, without waiting for the bar code symbol to be completely scanned. Assertions of the digitized output signal can commence as soon as the interpolation process for the first transition has been completed, and interpolation can be programmed to occur between the acquisition of successive analog samples, or could be implemented as a background process, or in a multiprocessor, as will be readily understood by those skilled in the art. It will also be apparent that the entire signal need not be stored to identify the transition points and produce a bit serial binary output, as only a limited number of key parameters derived from the data are required to be memorized.

While this invention has been explained with reference to the structure disclosed herein, it is not confined to the details set forth and this application is intended to cover any modifications and changes as may come within the scope of the following claims:

What is claimed is:

1. A method of accurately reconstructing from a sampled analog signal bar-to-space and space-to-bar transition points in a symbol comprising the steps of:
   accepting as input successive samples from an analog signal, said samples being representative of levels of reflectivity of a symbol being scanned;
   determining a white value associated with a space and a black value associated with a bar on said symbol;
   determining a threshold between said black value and said white value;
   determining from said input a preceding sample and a succeeding sample having values that bracket said threshold; and
   determining a transition point and an offset of said transition point from said preceding sample to define a first time interval therebetween by performing an interpolation that is limited to an interval between said preceding sample and said succeeding sample in the absence of upsampling.

2. The method of claim 1, further comprising the steps of
   generating an output, said output undergoing a transition between a first value representative of one of said black and white values to a second value representative of another of said black and white values after elapse of said first time interval following said determination of said transition point;
and wherein said step of determining a threshold is performed by steps comprising:
   calculating an excursion as the unsigned difference between said white value and said black value;
   calculating a magnitude as the product of said excursion and a constant;
   when said output is indicative of a high level of reflectivity, adjusting said white value by said magnitude in a direction that indicates decreasing reflectivity and determining said threshold as said adjusted white value; and
   when said output is indicative of a low level of reflectivity, adjusting said black value by said magnitude in a direction that indicates increasing reflectivity, and determining said threshold as said adjusted black value.

3. The method of claim 1, further comprising the step of
   generating an output prior to completely scanning the symbol, said output undergoing a transition between a first value representative of one of said black and white values to a second value representative of another of said black and white values after elapse of said first time interval following said determination of said transition point.

4. The method of claim 3, wherein said step of generating an output further comprises the step of initially generating said output at a predefined state.

5. The method of claim 4, wherein said predefined state has a value that corresponds to a high level of reflectivity in said symbol.

6. The method of claim 4, wherein said predefined state has a value that corresponds to a low level of reflectivity in said symbol.

7. The method of claim 4, wherein said predefined state has a value that is indicative of an initial reflectivity in accordance with a value from said input.

8. The method of claim 3, wherein said white value and said black value are determined from samples that are indicative of the highest and lowest levels of reflectivity in said symbol respectively.

9. The method of claim 3, wherein said step of generating an output comprises the step of
   generating a digitizer output that has a logical state at another logical state when a transition point is determined, whereby said digitizer output is indicative of high and low reflectivity levels in said symbol.

10. The method of claim 3, wherein said step of generating an output comprises the step of
    outputting a signal having a value that is indicative of a elapsed second time interval since said signal was last generated.

11. The method of claim 9 wherein said step of determining a threshold is performed by steps comprising:
    calculating an excursion as the unsigned difference between said white value and said black value;
    calculating a magnitude as the product of said excursion and a constant;
    when said digitizer output has a logical state indicative of a high level of reflectivity, adjusting said white value by said magnitude in a direction that indicates decreasing reflectivity and determining said threshold as said adjusted white value; and
    when said digitizer output has a logical state indicative of a low level of reflectivity, adjusting said black value by said magnitude in a direction that indicates increasing reflectivity, and determining said threshold as said adjusted black value.

12. The method of claim 11 wherein said constant is in a range of between 0.2 and 0.6.

13. The method of claim 11 wherein said constant has a value of 0.25.

14. The method of claim 3, wherein said white value and said black value are respectively determined from averages of samples that are associated with analog inputs indicative of high and low levels of reflectivity.

15. The method of claim 3, wherein said step of determining said white value and said black value is performed by assigning predetermined values thereto.

16. The method of claim 3, wherein said step of determining said threshold is performed by assigning a predetermined value thereto.

17. The method of claim 3, wherein said white value and said black value are determined from samples that are accepted subsequent to a generation of said output and are respectively indicative of the highest and lowest levels of reflectivity in a portion of said symbol.

18. The method of claim 17, wherein said samples are accepted subsequent to no more than two generations of said output.

19. The method of claim 3, wherein said interpolation is linear.

20. The method of claim 19 wherein said linear interpolation has a precision that is limited to $\frac{1}{8}$th of the interval between successive samples.

21. The method of claim 3 wherein said interpolation is non-linear.

22. A bar code scanner, comprising:
light receiving means for detecting light reflected from said symbol, and for generating a sampled analog signal in response thereto that is indicative of the bar-space pattern of said bar code symbol;
analog to digital converting means for converting said analog signal to a digital signal;
microprocessor means, accepting said digital signal as an input, for determining transition points that correspond to bar-to-space and space-to-bar transitions in said bar code symbol, said microprocessor means having a program resident in a memory thereof for determining a threshold, said program executing the steps of:
   determining a white value associated with a space and a black value associated with a bar on said bar code symbol;
   determining a threshold between said black value and said white value;
   determining from said digital signal a preceding sample and a succeeding sample having values that bracket said threshold;
   determining a transition point and an offset of said transition point from said preceding sample to define a first time interval therebetween by performing an interpolation that is limited to an interval between said preceding sample and said succeeding sample in the absence of upsampling; and
   generating an output that undergoes a transition between a first value representative of one of a high and low reflectivity levels to a second value representative of another of said high and low reflectivity levels after elapse of said first time interval following said determination of said transition point.

23. The bar code scanner of claim 22, wherein said scanner is contained in a single housing.

24. The bar code scanner of claim 22, wherein said output is digitized.

25. The bar code scanner of claim 22, further comprising means responsive to said microprocessor means for generating a signal that is indicative of said first time interval.

26. The bar code scanner of claim 25, wherein said means for generating generates a signal having a value that is indicative of a second time interval that has elapsed since a signal was last generated.

27. The bar code scanner of claim 22 wherein said step of determining a threshold further comprises the steps of:
   calculating an excursion as the unsigned difference between said white value and said black value;
   calculating a magnitude as the product of said excursion and a constant;
   adjusting said white value by said magnitude in a direction that indicates decreasing reflectivity; and
   adjusting said black value by said magnitude in a direction that indicates increasing reflectivity.

28. The bar code scanner of claim 27 wherein said constant is in a range of between 0.2 and 0.6.

29. The bar code scanner of claim 27 wherein said constant has a value of 0.25.

* * * * *